(12) United States Patent
Kim et al.

(10) Patent No.: US 8,334,750 B2
(45) Date of Patent: Dec. 18, 2012

(54) INTEGRATED ANTENNA MODULE FOR PUSH BUTTON START VEHICLE AND EMERGENCY START METHOD USING THE SAME

(75) Inventors: Jong Gyu Kim, Incheon (KR); Sin Gu Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 223 days.

(21) Appl. No.: 12/780,384

(22) Filed: May 14, 2010

(65) Prior Publication Data

US 2011/0109432 A1      May 12, 2011

(30) Foreign Application Priority Data

Nov. 11, 2009   (KR) .......................... 10-2009-0108823

(51) Int. Cl.
*G08C 19/00* (2006.01)
(52) U.S. Cl. .................................. 340/5.64; 340/572.7
(58) Field of Classification Search ................. 340/5.61, 340/5.62, 5.63, 5.64, 5.65, 5.7, 5.71, 5.72, 340/572.1, 572.7, 426.11, 5.31, 5.23; 701/33, 701/29
See application file for complete search history.

(56) References Cited

U.S. PATENT DOCUMENTS

| | | | | |
|---|---|---|---|---|
| 6,005,700 A | * | 12/1999 | Pressler et al. ................ | 398/117 |
| 2002/0105411 A1 | * | 8/2002 | Maeda et al. ................. | 340/5.64 |
| 2004/0235432 A1 | * | 11/2004 | Lin et al. ...................... | 455/90.3 |
| 2006/0022795 A1 | * | 2/2006 | Nakamura et al. ............ | 340/5.61 |
| 2006/0244666 A1 | * | 11/2006 | Noro et al. .................... | 343/702 |
| 2007/0222557 A1 | * | 9/2007 | Yoshimura et al. ........... | 340/5.72 |

FOREIGN PATENT DOCUMENTS

| | | |
|---|---|---|
| JP | 2001-063526 A | 3/2001 |
| JP | 2008-095469 A | 4/2008 |
| KR | 10-2006-0036210 | 4/2006 |
| KR | 10-2008-0043668 | 5/2008 |
| KR | 10-2009-0062174 | 6/2009 |

* cited by examiner

*Primary Examiner* — Nabil Syed
(74) *Attorney, Agent, or Firm* — Edwards Wildman Palmer LLP; Peter F. Corless

(57) ABSTRACT

The present invention provides an integrated antenna module for a push button start vehicle and an emergency start method using the same, which can perform a series of processes of starting a vehicle, such as power supply to a transponder, secret code authentication, start-up authorization, etc., when a driver simply brings the fob close to a specific location in the vehicle, without the use of the existing fob holder for an emergency start.

4 Claims, 9 Drawing Sheets

INTEGRATED ANTENNA MODULE FOR PUSH BUTTON START VEHICLE AND EMERGENCY START METHOD USING THE SAME

CROSS-REFERENCE TO RELATED APPLICATION

This application claims under 35 U.S.C. §119(a) the benefit of Korean Patent Application No. 10-2009-0108823 filed Nov. 11, 2009, the entire contents of which are incorporated herein by reference.

BACKGROUND (a) Technical Field

The present disclosure relates, generally, to an integrated antenna module for a vehicle. More particularly, it relates to an antenna system that is configured to communicate with a fob in a situation where an emergency start is required, for example, in a situation where a battery of the fob is discharged.

(b) Background Art

Recently, many automobile companies are applying push button start systems to vehicles.

A considerable advantage of the push button start is to start the vehicle only with a simple push button operation, in which a start button is used as an ON/OFF switch to start the vehicle. However, many electronic devices are mounted in the vehicle, and thus OFF, ACC, IG, and START switch contacts are provided to effectively apply electrical power to these electronic devices.

In a vehicle in which the push button start system is suitably employed, the existing key box is eliminated, and thus the OFF, ACC, IG, and START powers are not suitably supplied by the switch contacts. Instead, a power control unit (e.g., smart key ECU) controls an output relay to supply electrical power based on the condition of the vehicle.

The existing mechanical key includes contacts switched by key operation. However, in the case of the push button start system, only a single push button is used to input commands. Accordingly, the push button start system includes a predetermined power logic such that an electronic control unit connected to the start button transmits a power transfer command such as OFF→ACC→IG→OFF or OFF→ACC→IG→START (when pushed together with a brake pedal) to a power distribution module (PDM) according to the order of pressing the push button and thereby the PDM supplies electrical power to an electronic steering column lock (ESCL), operates a power relay, and drives a starter motor.

During start-up, for example, when a driver carrying a fob (e.g., smart key) capable of bidirectional wireless communications approaches the vehicle, the push button start system authenticates the driver by comparing authentication information (e.g., secret code) between the vehicle and the fob. Upon completion of authentication, the electronic control unit releases the lock of the ESCL and, when the driver depressing the brake pedal pushes the start button, the PDM operates the power relay to drive the starter motor.

FIG. 1 is a block diagram showing an example of a typical button start system.

As shown in the figure, the button start system includes a power distribution module (PDM) 10, a smart key ECU 40, a start stop button (SSB) 20, an electronic steering column lock (ESCL) 30, and a fob holder 50.

The SSB 20 is a start button, which allows a driver to input a power transfer command and allows the PDM 10 to perform the power transfer according to the order of pressing the push button. The PDM 10 is a module to change the power state to ACC, IG1, IG2, cranking, and engine running (slave operation).

The smart key ECU 40 is suitably connected to the PDM 10 through a CAN communication line to provide a command to allow the PDM 10 to operate (master operation) and operates at a low frequency (LF) to locate a fob 60.

The ESCL 30 electronically controls the locking and unlocking of a steering column, and the fob holder 60 is a kind of holder in which the fob 50 is inserted to perform an immobilizer communication.

When the SSB 20 is suitably pressed in the above-described button start system, an SSB input signal is suitably input to the smart key ECU 40, and the smart key ECU 40 operates an LF antenna 42 to transmit an electromagnetic wave, thereby determining whether the fob 60 is in the interior of the vehicle.

Accordingly, the fob 60 in the interior of the vehicle responds to the wireless frequency signal transmitted from the LF antenna 42 by transmitting a signal containing authentication information. Then, the smart key ECU 40 checks the authentication information transmitted from the fob 60 to determine whether a valid fob 60 is in the interior of the vehicle.

In the case where the fob 60 is in the interior of the vehicle, the smart key ECU 40 transmits an unlock command of the steering column to the ESCL 30 and transmits a power transfer command to the PDM 10.

Accordingly, during IG ON, the smart key ECU 40 communicates with an engine management system (EMS) 70, and the EMS 70 determines an EMS running or cut by performing authentication to initiate the start-up in the event of EMS running.

Preferably, the smart key ECU 40 and the PDM 10 confirm the start-up running and then complete the power transfer.

In the button start system, in examples where the fob is carried by the driver or kept in the interior of the vehicle, when the SSB as the start button is pressed after the shift lever is shifted to the parking position (P) and the brake pedal is depressed, the engine is started through wireless communications between the fob and the smart key ECU. During shut-down of the engine, when the start button is pressed after the brake pedal is depressed and the shift lever is shifted to the parking position, the engine is shut down. Since the button start is based on the wireless communications, if a battery of the fob is discharged, it is impossible to authenticate the fob and start the engine in a normal way, and thus it is necessary to use an emergency start method.

As an emergency start method, a method in which a fob is inserted into a fob holder is widely used.

Referring to FIG. 2, according to the method in which the fob is inserted into the fob holder, the fob holder 50 is typically mounted on the right side of the steering column, and a coil antenna (i.e., immobilizer coil antenna) 51 and a demodulator (PCB) 52 connected to the PDM 10 are mounted in the fob folder 50.

Preferably, in this state, when the fob 60 is suitably inserted into the fob holder 50, a base station in the fob holder 50 suitably operates the coil antenna (i.e., immobilizer coil antenna) 51 to generate electric field and thereby electrical power is supplied to a transponder (TP) 61 mounted in the fob 60.

Preferably, then, an authentication process is performed on the fob 60 through the communication with the transponder 61 receiving the electrical power, and the base station of the fob holder 50 transmits the authentication result to the PDM 10 to permit the start-up.

In addition to the above-described emergency start method in which the fob 60 is inserted into the fob holder 50, U.S. patent application Ser. No. 10/528,148, incorporated by reference in its entirety herein, discloses an emergency engine start method in which a fob is inserted into a fob holder after opening a button cover and an authentication process is performed through an infrared (IR) communication.

In these described methods, however, the manufacturing cost is increased since the fob holder should be provided besides the start button. A failure may occur in the area where the fob is inserted and fixed to the fob holder (that is, the fob inserted into the fob holder may not be fixed to the fob holder). Moreover, after inserting the fob, the fob may not be pulled out due to damage of the fob holder.

Furthermore, it is difficult to select an appropriate position for the fob holder, and the degree of freedom is reduced in terms of vehicle design and package layout.

In addition, although the fob holder should be used for emergency purposes, the driver may frequently use the emergency start method by inserting the fob into the fob holder. The fob holder also may present issues with regards to the reliability or quality of a fob.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides an antenna system configured to communicate with a fob in a situation where an emergency start is required, for example, in a situation where a battery of the fob is suitably discharged, so as to perform a series of processes of starting a vehicle, such as power supply to a transponder, secret code authentication, start-up authorization, etc., when a driver simply brings the fob close to a specific location in the vehicle, without the use of the existing fob holder for an emergency start.

In preferred embodiments, the present invention provides an integrated antenna module, in which an immobilizer coil antenna, which suitably generates electric field to supply electrical power to a transponder mounted in a fob, and an LF antenna, which suitably communicates with the transponder of the fob during secret code authentication, are preferably operated when a driver brings the fob close to the integrated antenna module during an emergency start to permit the emergency start, without the use of the existing fob holder for an emergency start.

In preferred embodiments, the present invention provides an integrated antenna module, in which an immobilized coil antenna and an LF antenna are suitably integrated to reduce the size of the antenna module, and a shielding guide is suitably interposed between the immobilizer coil antenna and the LF antenna to prevent magnetic field interference between the two antennas.

In one preferred embodiment, the present invention provides an integrated antenna module including an immobilizer coil antenna suitably configured to generate electric field to supply electrical power to a transponder in a fob when the fob is brought close to the immobilizer coil antenna; an LF antenna suitably configured to communicate with the transponder in the fob for authentication of the fob; and a shielding guide, on which the immobilizer coil antenna is mounted, connected to the LF antenna to prevent magnetic field interference between the two antennas, wherein the immobilizer coil antenna and the LF antenna are integrally connected with the shielding guide interposed therebetween.

In another preferred embodiment, the present invention provides an emergency start method using an integrated antenna module, the method including allowing a driver to bring a fob close to an integrated antenna module located in a predetermined position in the interior of a vehicle; allowing an immobilizer coil antenna of the integrated antenna module to generate electric field to supply electrical power to a transponder of the fob in a state where drive power is suitably applied from an electronic control unit; allowing an LF antenna of the integrated antenna module to receive authentication information transmitted from the transponder and transmit the received authentication information to the electronic control unit; allowing the electronic control unit to compare the received authentication information with stored authentication information; and suitably performing a start control to start the vehicle by detecting a signal according to the driver's operation for starting the vehicle when the electronic control unit determines that the received authentication information coincides with the stored authentication information.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
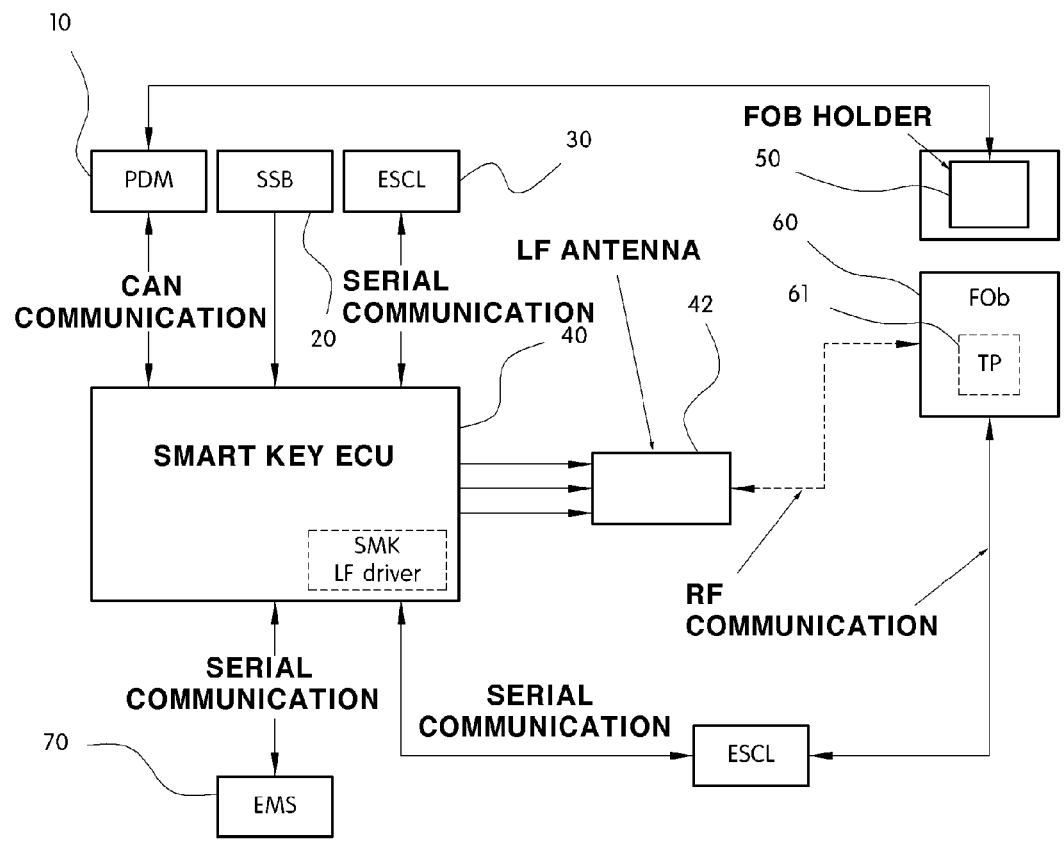
FIG. 1 is a block diagram showing an example of a typical button start system.
Figure 2:
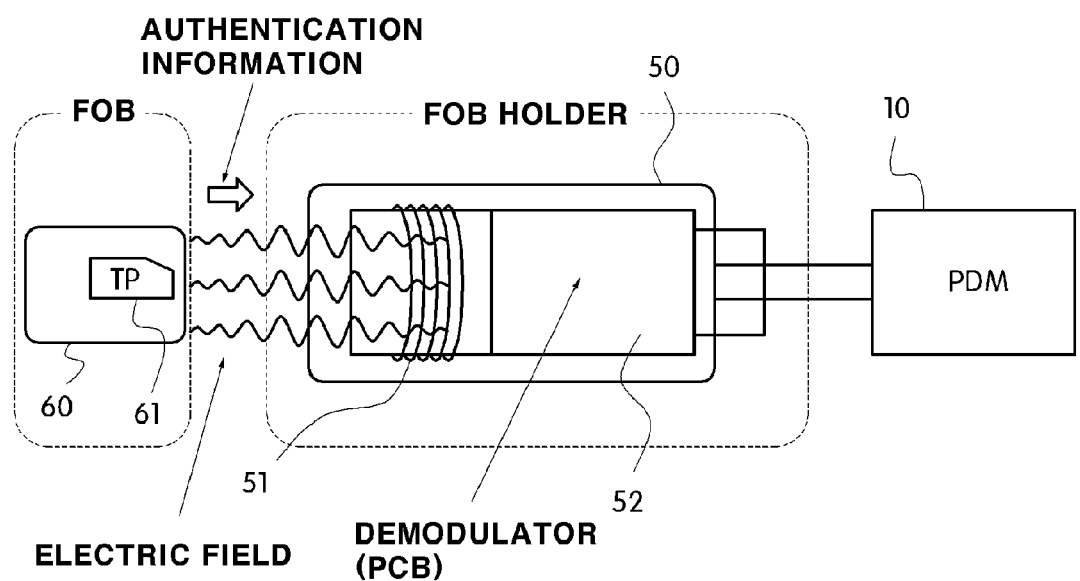
FIG. 2 is a schematic diagram showing the use of a fob and a fob holder for an emergency start in accordance with a prior art.

Reference numerals set forth in the Drawings includes reference to the following elements as further discussed below:

100: integrated antenna module
110: immobilizer coil antenna
113a: connection hook
120: shielding guide
130: LF antenna
140: electronic control unit It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

In one aspect, the present invention features an integrated antenna module comprising an immobilizer coil antenna configured to generate an electric field to supply electrical power to a transponder in a fob, an LF antenna, and a shielding guide, wherein the immobilizer coil antenna and the LF antenna are integrally connected with the shielding guide interposed therebetween.

In one embodiment, the immobilizer coil antenna is configured to generate electric field to supply electrical power to a transponder in a fob when the fob is brought close to the immobilizer coil antenna.

In another embodiment, the LF antenna is configured to communicate with the transponder in the fob for authentication of the fob.

In another further embodiment, the immobilizer coil antenna is mounted on the shielding guide, and the shielding guide is connected to the LF antenna to prevent magnetic field interference between the two antennas.

In another aspect, the present invention features an emergency start method using an integrated antenna module, the method comprising allowing a driver to bring a fob close to an integrated antenna module located in a predetermined position in the interior of a vehicle, allowing an immobilizer coil antenna of the integrated antenna module to generate electric field to supply electrical power to a transponder of the fob in a state where drive power is applied from an electronic control unit; allowing an LF antenna of the integrated antenna module to receive authentication information transmitted from the transponder and transmit the received authentication information to the electronic control unit, allowing the electronic control unit to compare the received authentication information with stored authentication information; and performing a start control to start the vehicle by detecting a signal according to the driver's operation for starting the vehicle when the electronic control unit determines that the received authentication information coincides with the stored authentication information.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

According to preferred embodiments, an integrated antenna module in accordance with the present invention is provided to be used in a push button start and smart key system. Preferably, the present invention provides an integrated antenna module as described herein, in which a fob holder for an emergency start in accordance with a prior art is eliminated.

According to preferred embodiments, the present invention provides an antenna system suitably configured to communicate with a fob in a situation where an emergency start is required, for example, in a situation where a battery of the fob is discharged, so as to perform a series of processes of starting a vehicle, such as power supply to a transponder, secret code authentication, start-up authorization, etc., when a driver simply brings the fob close to a specific location in the vehicle, instead of using the existing fob holder for an emergency start.

In particular preferred embodiments, the integrated antenna module of the present invention is suitably formed by integrating an immobilizer coil antenna, which generates a suitable electric field to supply electrical power to a transponder in the fob when the fob is brought close to the integrated antenna module during an emergency start, and an LF antenna which communicates with the transponder in the fob during secret code authentication, in which a structure to prevent magnetic field interference between the two antennas is suitably provided.

Figure 3:
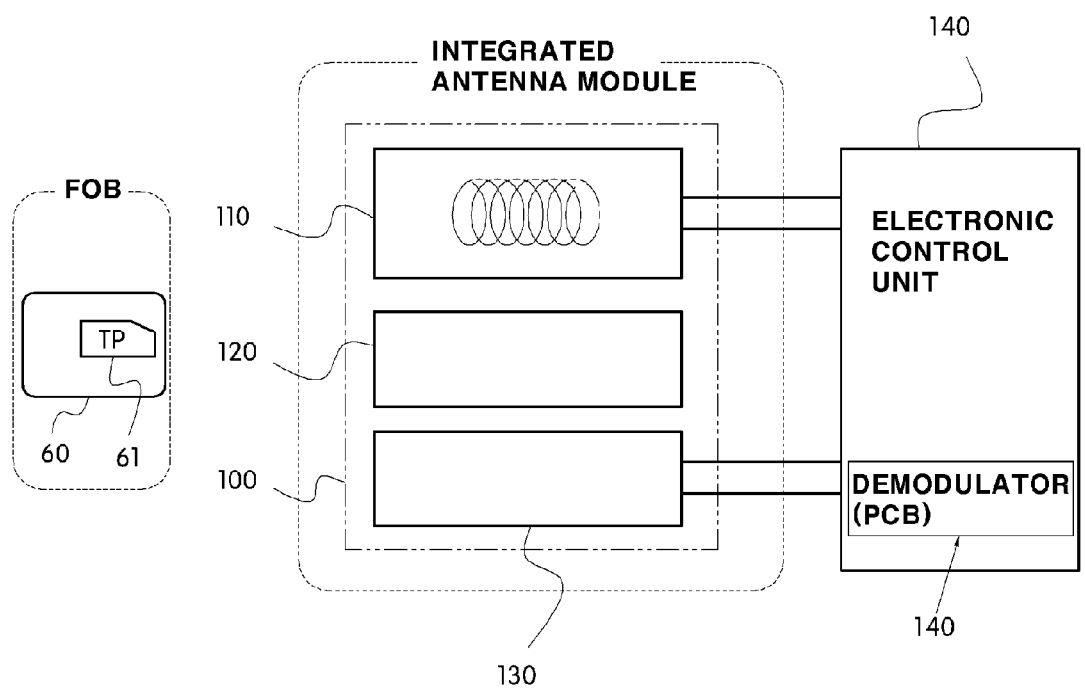
FIG. 3 is a schematic diagram showing the use of an integrated antenna module in accordance with an exemplary embodiment of the present invention.

Referring to FIG. 3, in certain preferred embodiments, an integrated antenna module 100 in which an immobilizer coil antenna 110 and an LF antenna 130 are suitably integrated is provided, and a shielding guide 120 is suitably interposed between the immobilizer coil antenna 110 and the LF antenna 130 in the integrated antenna module 100 to prevent the magnetic field interference between the two antennas 110 and 130.

Preferably, the immobilizer coil antenna 110, the LF antenna 130, and the shielding guide 120 are integrally connected to form the integrated antenna module 100.

In further preferred embodiments, the immobilizer coil antenna 110 and the LF antenna 130 are suitably connected to an electronic control unit 140, e.g., smart key ECU.

Preferably, the smart key ECU 140 controls the operation of the two antennas 110 and 130 and includes a demodulator (PCB) 141 to perform an authentication process on a fob 60 based on authentication information (e.g., secret code) transmitted from a transponder 61 of the fob 60.

An emergency start method according to preferred embodiments of the present invention is described herein below. In a preferred exemplary embodiment, when a driver brings the fob 60 close to the integrated antenna module 100 of the present invention, the smart key ECU 140 operates the immobilizer coil antenna 110 to generate a suitable electric field, and thereby electrical power is supplied to the transponder 61 in the fob 60.

In a further preferred embodiment, the authentication process is suitably performed through the communication between the transponder 61 receiving the electrical power and the LF antenna 130. Further, when the transponder 61 transmits authentication information in response to an authentication information request signal transmitted from the LF antenna 130, the LF antenna 130 suitably inputs the received authentication information to the smart key ECU 140, and the demodulator 141 of the smart key ECU 140 checks the authentication information to determine whether the fob 60 is valid.

Preferably, when it is determined by the demodulator 141 that the fob 60 is valid after checking the authentication information transmitted from the fob 60, the smart key ECU 140 permits a push button start, and thereby, when the driver operates the start button while suitably depressing the brake pedal in a normal way, the vehicle is started.

The structure of the integrated antenna module 100 according to preferred embodiments of the present invention is described with reference to FIGS. 4 to 7.

In a first exemplary embodiment, the immobilizer coil antenna 110 has a structure in which a coil 111 is suitably wound on a circular bobbin 112.

Preferably, the immobilizer coil antenna 110 is suitably connected to the shielding guide 120 as a shielding structure for preventing the magnetic field interference by a connection means, and the shielding guide 120 is connected to the LF antenna 130 by a separate connection means.

Accordingly, the immobilizer coil antenna 110 in which the coil 111 is wound on the circular bobbin 112, the shielding guide 120, and the LF antenna 130 are integrally connected to form the integrated antenna module 100 of the present invention as a single component.

Preferably, a coil connector 113b, to which the wound coil is internally connected, is suitably provided on one side of the bobbin 112 of the immobilizer coil antenna 110, and a wire connector 115 is connected to the coil connector 113b such that the coil 111 and a wire 114 are electrically connected to each other.

Preferably, in further preferred embodiments, the wire 114 is electrically connected to an external connector 132.

Preferably, the shielding guide 120 serves as a connection structure configured to integrally connect the two antennas 110 and 130 in addition to the function of preventing the magnetic field interference between the two antennas 110 and 130. In further preferred embodiments, the shielding guide 120 has a plate shape such that the immobilizer coil antenna 110 is suitably mounted and supported on the upper surface thereof, and both ends thereof are suitably connected to the LF antenna 130 by connection means such as screws (not shown).

Preferably, the LF antenna 130 may have a rectangular parallelepiped shape elongated in one direction, and a wire 131 extending from the LF antenna 130 to the outside is electrically connected to the external connector 132, like the wire 114 of the immobilizer coil antenna 110.

Preferably, the external connector 132 is connected to two pairs of wires 114 and 131 of the immobilizer coil antenna 110 and the LF antenna 130, that is, connected to a total of four wires, and thus includes four connection pins (not shown) for externally connecting the wires 114 and 131.

According to further preferred embodiments, each of the connection pins of the external connector 132 is suitably connected to a wire (not shown) extending from the smart key ECU 140 shown in FIG. 3 such that the two antennas 110 and 130 are electrically connected to the smart key ECU 140.

Accordingly, in a state where the two antennas are suitably connected to the smart key ECU, the smart key ECU supplies drive power to each antenna and receives the authentication information transmitted from the transponder in the fob through the LF antenna.

Preferably, in an exemplary embodiment, the immobilizer coil antenna 110 is suitably detachably assembled to the shielding guide 120 such that its position can be adjusted in the longitudinal direction. Preferably, a plurality of connection hooks 113a as a connection means may suitably protrude downward from the lower surface of the bobbin 112 of the immobilizer coil antenna 110.

Figure 6:
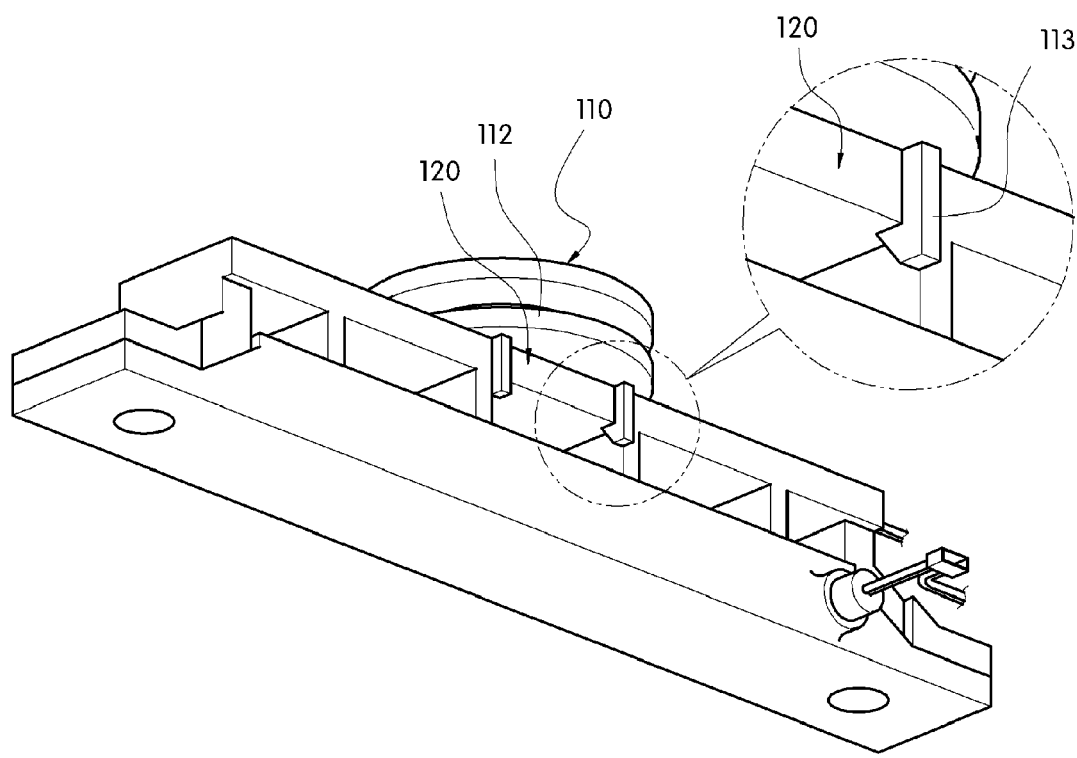
FIG. 6 is a perspective view showing a structure in which a bobbin of an immobilizer coil antenna is connected to a shielding guide by hooks in an integrated antenna module in accordance with an exemplary embodiment of the present invention.

Preferably, the connection hooks 113a are provided on both left and right sides of the lower surface of the bobbin 112 so as to be suitably secured to both side ends of the shielding guide 120 at the same time, and as shown in FIG. 6, each connection hook 113 is fastened to the shielding guide 120 to integrally fix the immobilizer coil antenna 110.

Although a total of four connection hooks 113a are fastened to both side ends of the shielding guide 120 in the shown embodiment, the number of the connection hooks 113a may be variously changed.

Figure 7:
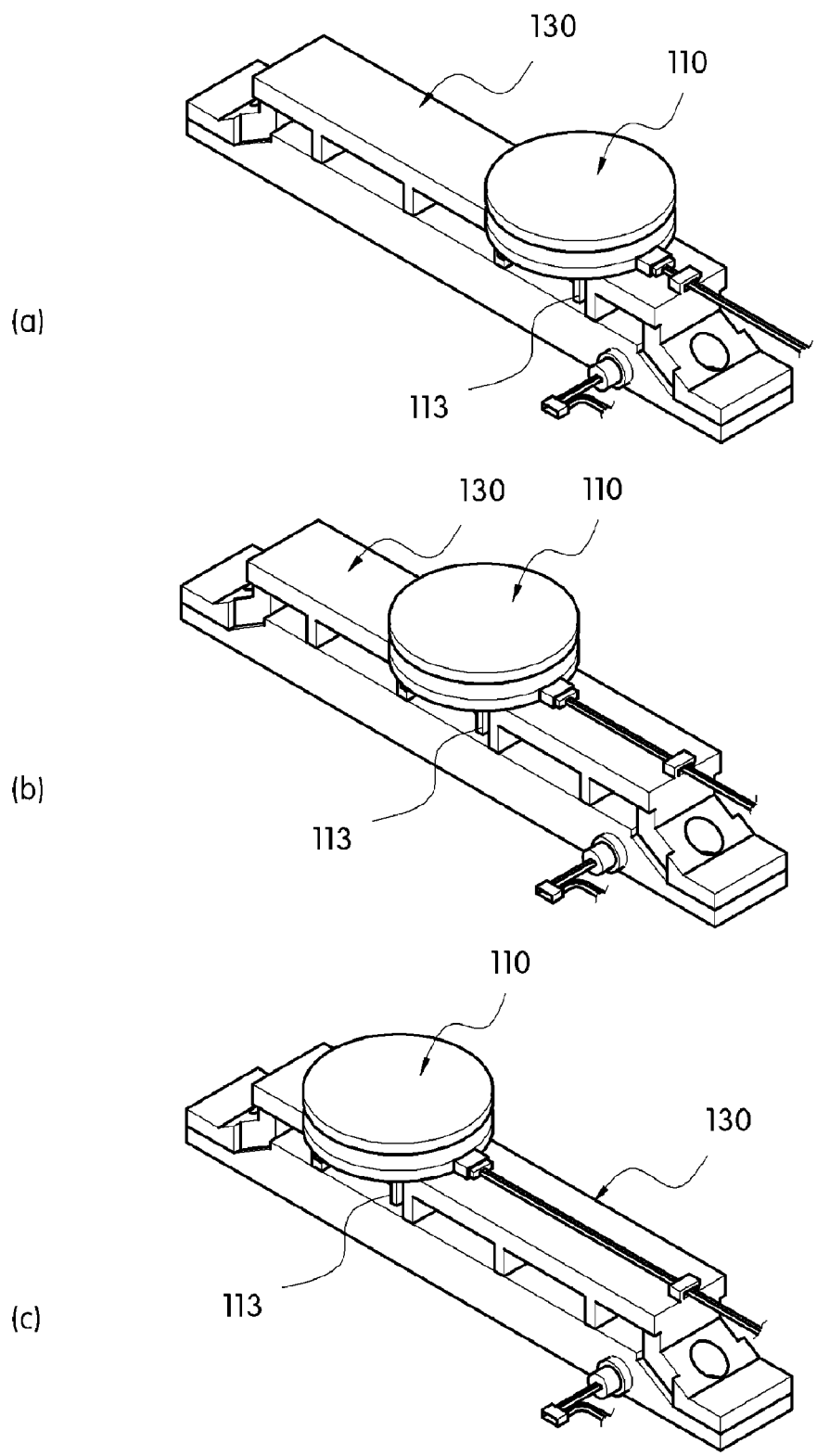
FIG. 7 is a perspective view showing examples in which the position of an immobilizer coil antenna is adjusted in an integrated antenna module in accordance with an exemplary embodiment of the present invention.

FIG. 7 shows examples in which the immobilizer coil antenna 110 is moved to various positions on the shielding guide 120. In certain exemplary embodiments, during assembly of the integrated antenna module 100, the position of the immobilizer coil antenna 110 can be suitably adjusted to a desired position on the shielding guide 120 and mounted thereon.

Figure 8:
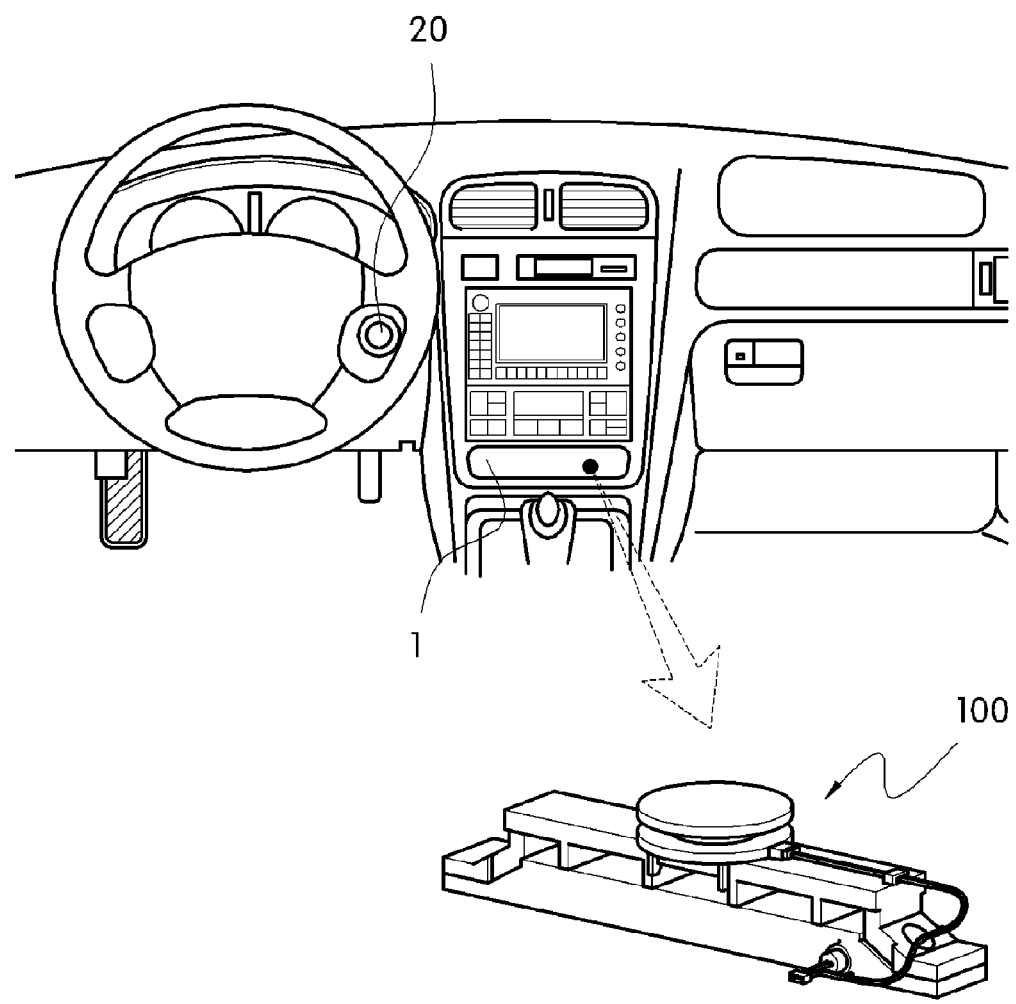
FIG. 8 is a diagram showing an example of the position in which an integrated antenna module in accordance with an exemplary embodiment of the present invention is installed.

In other further embodiments, the integrated antenna module 100, for example as shown in FIG. 8, may be suitably mounted on the inside of a receiving portion at the bottom of a center facia between a driver's seat and a front passenger's seat, i.e., on the inside of a package tray 1 such that the driver performs an emergency start only by positioning the fob inside the package tray 1 and operating a brake pedal (not shown) and a start button 20.

Accordingly, the immobilizer coil antenna 110 is suitably installed in the integrated antenna module 100 after the position of the immobilizer coil antenna 110 is appropriately adjusted, as shown in FIG. 7, according to the position of the integrated antenna module 100 mounted on the inside of the package tray 1.

Further, since the integrated antenna module of the present invention is configured such that the immobilizer coil antenna is located in a desired position, it is possible to adjust to the change in the vehicle design.

Figure 4:
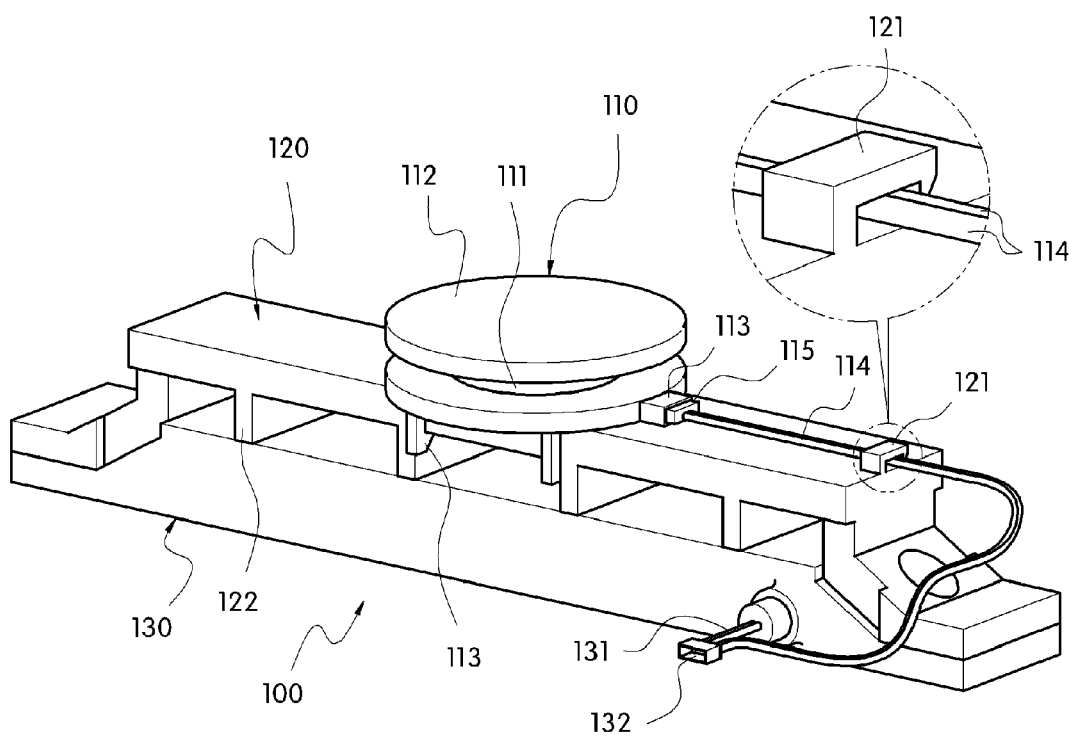
FIG. 4 is a perspective view showing the structure of an integrated antenna module in accordance with an exemplary embodiment of the present invention.
Figure 5:
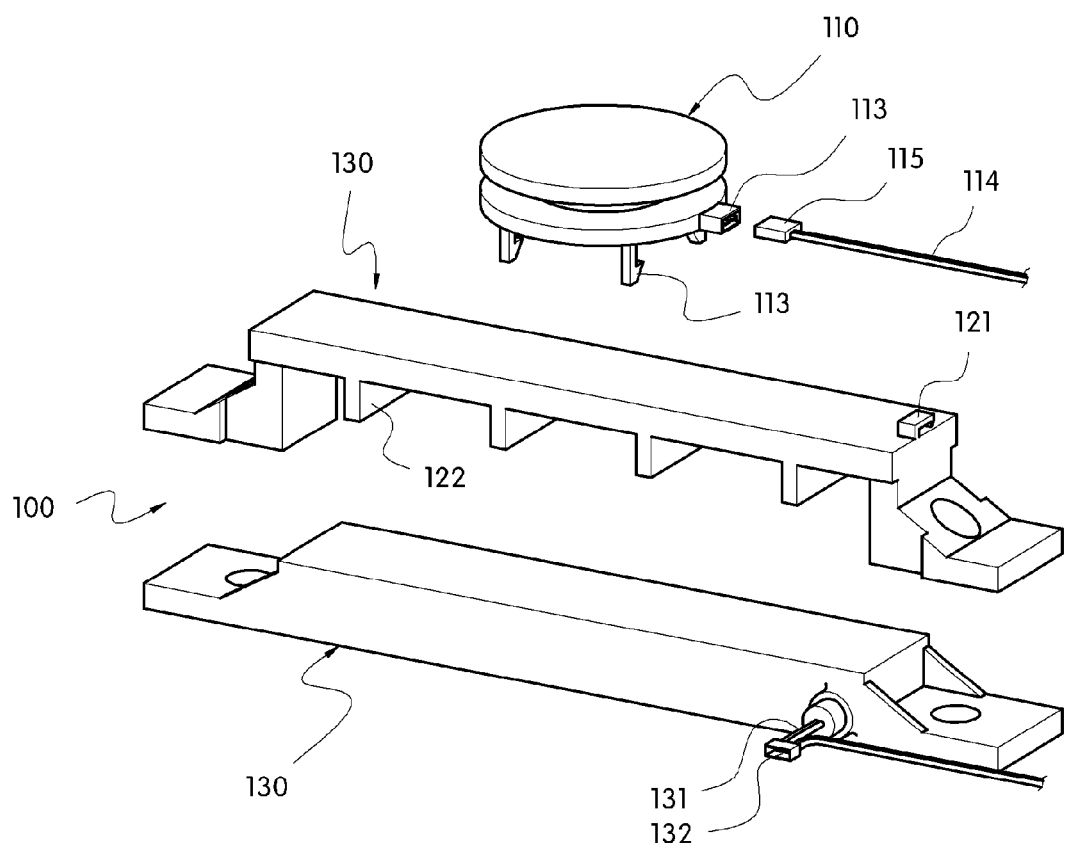
FIG. 5 is an exploded perspective view of an integrated antenna module in accordance with an exemplary embodiment of the present invention.

Reference numeral 121 in FIGS. 4 and 5 denotes a fixing hook to fix the wire 114 of the immobilizer coil antenna 110 on the upper surface of the shielding guide 120 in such a manner that the wire 114 is suitably inserted into the fixing hook 121 and then is connected to the external connector 132 according to certain exemplary embodiments of the present invention.

Reference numeral 122 denotes a stopper to prevent the immobilizer coil antenna 110, which is suitably fixed on the shielding guide 120, from moving from its fixed position, and a plurality of stoppers 122 protrude from the lower surface of the shielding guide 120 at regular intervals, according to further preferred embodiments of the present invention.

Preferably, the connection hooks 113a are caught by the stoppers 122 to suitably prevent the immobilizer coil antenna 110 fixed by the connection hooks 113a from unexpectedly moving on the shielding guide 120.

Further, the stoppers 122 are placed on the upper surface of the LF antenna 130, and the shielding guide 120 is integrally assembled on the LF antenna 130 in a state where the stoppers 122 are placed on the upper surface of the LF antenna 130.

Preferably, the integrated antenna module 100 in accordance with the present invention can be provided as a single component in which the immobilizer coil antenna 110 and the LF antenna 130 are integrally assembled.

Figure 9:
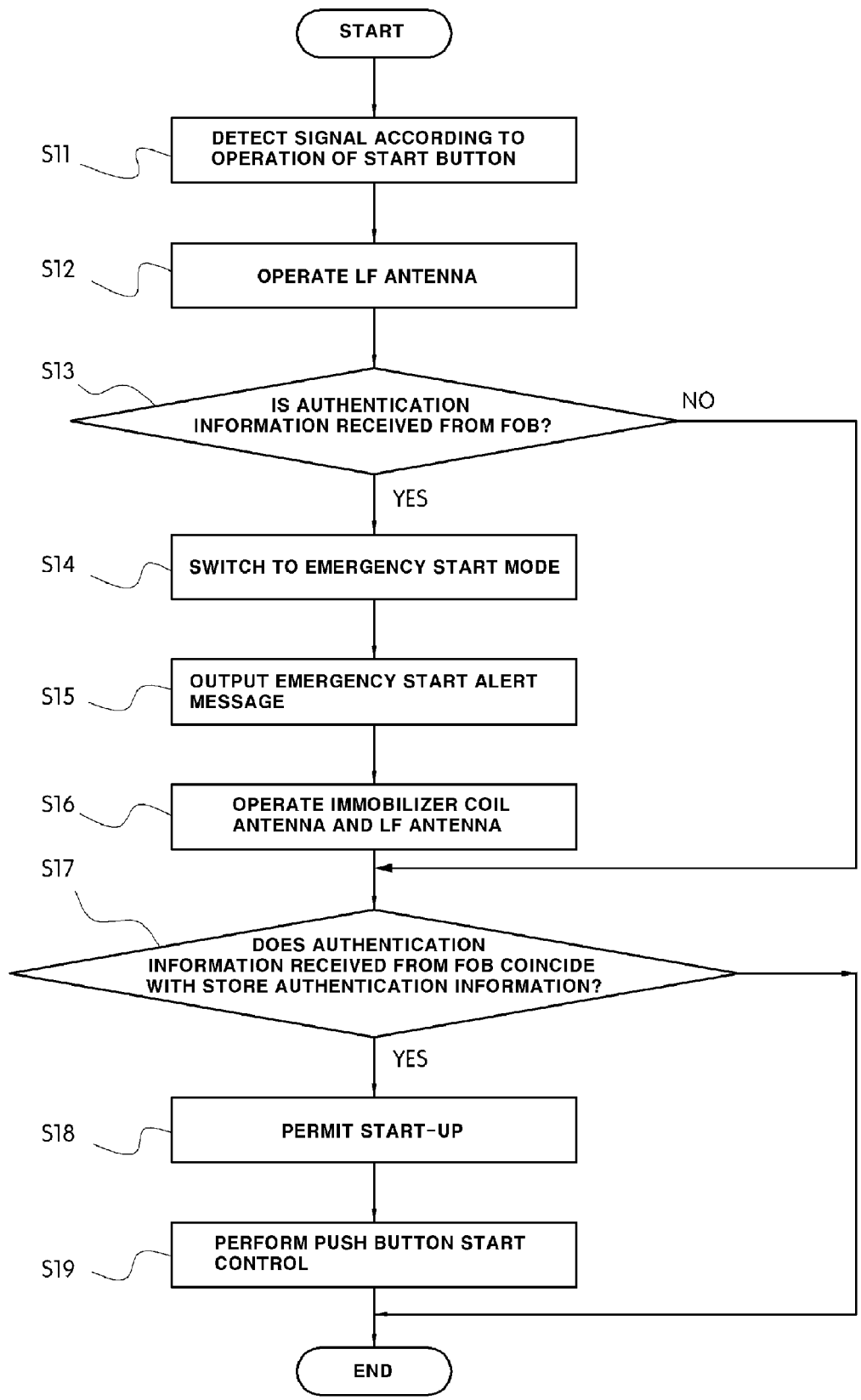
FIG. 9 is a flowchart showing an emergency start method using an integrated antenna module in accordance with another exemplary embodiment of the present invention.

According to exemplary preferred embodiments and as shown in FIG. 9, FIG. 9 is a flowchart showing an emergency start method using the integrated antenna module in accordance with the present invention, which will be described below.

Preferably, first, when a driver carrying the fob operates the start stop button (SSB) while depressing the brake pedal to start the vehicle, the smart key ECU detects a signal according to the driver's operation of the SSB (S11) and then operates the LF antenna to perform the authentication process (S12 and S13).

That is, the smart key ECU determines whether a valid fob is in the interior of the vehicle through the communication.

Accordingly, at this time, if a normal signal is not suitably input from the fob due to discharge of the fob's battery even when the driver carrying the valid fob tries to start the vehicle, the smart key ECU determines that there is no fob in the interior of the vehicle and thus does not permit the start-up.

In this case, the emergency start is preferably performed. If no authentication information having a predetermined RF frequency is suitably received from the fob for a predetermined period of time after the driver's operation of the SSB, the smart key ECU switches to an emergency start mode (S14).

Preferably, the smart key ECU suitably supplies the power of the battery to a cluster and outputs an emergency start alert message to inform the driver of the current situation which requires an emergency start (S15) and operates the immobilizer coil antenna and the LF antenna (S16).

Accordingly, in further preferred embodiments, the driver recognizes the situation which requires an emergency start and brings the fob close to the position where the integrated antenna module is mounted. For example, the driver places the fob on the inside of the package tray (denoted by reference numeral 1 in FIG. 8).

Preferably, when the fob is placed on the inside of the package tray, the immobilizer coil antenna of the integrated antenna module generates electric field in a state where the drive power is applied from the smart key ECU, and thereby electrical power is suitably supplied to the transponder of the fob placed on the inside of the package tray.

Preferably, the transponder receiving the electrical power transmits the authentication information to the smart key ECU through the LF antenna.

Accordingly, in preferred exemplary embodiments, then, the demodulator in the smart key ECU checks the authentication information to determine whether the received authentication information coincides with the stored authentication information (S17) and, if it is determined that the received authentication information coincides with the stored authentication information, transmits a start permission message to the EMS (S18).

Accordingly, as a result, in the above-described emergency start mode, the smart key ECU detects a signal according to the driver's operation of the SSB in a state where the brake pedal is depressed and performs the typical start control process to permit the push button start control, thus starting the vehicle (S19).

As described herein, according to the integrated antenna module of the present invention, since the existing fob holder that is additionally provided for an emergency start is eliminated, it is possible to solve certain problems associated with the installation and use of the fob holder such as the difficulty in selecting the installation position of the fob holder, the limitations in the vehicle design, the increase in the manufacturing cost, the occurrence of failure in the components, etc.

According to further preferred embodiments, since the immobilizer coil antenna and the LF antenna, which are used for the authentication in the push button start and smart key system, are suitably integrated into a compact integrated antenna module, it is possible to suitably minimize the limitations in selecting the installation position of the integrated antenna module in the interior of the vehicle.

Furthermore, since the shielding guide interposed between the two antennas is used to suitably connect the two antennas, it is possible to effectively prevent the magnetic field interference between the two antennas, and especially, since the position of the immobilizer coil antenna can be adjusted to a desired position if necessary, it is possible to adjust to a change in the vehicle design.

In addition, the integrated antenna module as described herein of the present invention can perform a series of processes of starting the vehicle, such as power supply to the transponder, secret code authentication, start-up authorization, etc., when the driver simply brings the fob close to a specific location in the vehicle (e.g., in a package tray), without the inconvenience of having to inserting the fob into the fob holder.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An integrated antenna module comprising:
   an immobilizer coil antenna configured to generate electric field to supply electrical power to a transponder in a fob when the fob is brought close to the immobilizer coil antenna;
   an LF antenna configured to communicate with the transponder in the fob for authentication of the fob; and
   a shielding guide, on which the immobilizer coil antenna is mounted, connected to the LF antenna to prevent magnetic field interference between the two antennas,
   wherein the immobilizer coil antenna and the LF antenna are integrally connected with the shielding guide interposed therebetween,
   wherein the immobilizer coil antenna is detachably connected to the shielding guide so as to adjust its position in a longitudinal direction on the shielding guide, the immobilizer coil antenna is connected to the shielding guide by a plurality of connection hooks, the shielding guide has a plate shape to which the immobilizer coil antenna is mounted and supported, and the connection hooks protrude downward from the immobilizer coil antenna and are connected to both side ends of the shielding guide.

2. The integrated antenna module of claim 1, wherein the shielding guide comprises a plurality of stoppers protruding from a lower surface of the shielding guide and mounted and supported on an upper surface of the LF antenna, and the connection hooks are caught by the stoppers to prevent the immobilizer coil antenna from moving.

3. The integrated antenna module of claim 1, wherein the immobilizer coil antenna has a structure in which a coil is wound on a circular bobbin.

4. The integrated antenna module of claim 1, wherein the shielding guide comprises a fixing hook through which a wire of the immobilizer coil antenna is inserted and fixed.

* * * * *